United States Patent [19]

Petelka

[11] Patent Number: 5,050,923

[45] Date of Patent: Sep. 24, 1991

[54] WATERPROOF SIDE ROLLING TARP SYSTEM

[75] Inventor: Brian W. Petelka, Burlington, Canada

[73] Assignee: Aero-Kit Industries Inc., Burlington, Canada

[21] Appl. No.: 657,561

[22] Filed: Feb. 20, 1991

[51] Int. Cl.$^5$ .............................................. B60P 7/04
[52] U.S. Cl. ...................................... 296/98; 296/100
[58] Field of Search ........................... 296/98, 100, 105

[56] References Cited

U.S. PATENT DOCUMENTS

| | | | |
|---|---|---|---|
| 2,594,910 | 4/1952 | Germann | 296/98 |
| 4,484,777 | 11/1984 | Michel | 296/98 |
| 4,854,630 | 8/1989 | Biancale | 296/100 |
| 4,915,439 | 4/1990 | Cramaro | 296/98 |
| 4,923,240 | 5/1990 | Swanson | 296/100 |
| 4,944,551 | 7/1990 | Hardy | 296/100 |

FOREIGN PATENT DOCUMENTS

| | | | |
|---|---|---|---|
| 728051 | 4/1955 | United Kingdom | 296/98 |
| 2027646 | 2/1980 | United Kingdom | 296/98 |

Primary Examiner—Margaret A. Focarino
Assistant Examiner—Gary C. Hoge

[57] ABSTRACT

A side rolling tarpaulin system to cover an open top container comprising a lead bow and a series of intermediate bows crossing the open top of the container and moveable from trapaulin-supporting positions at regular locations along the length of the container top to storage position at the front end of the container. A strap is secured to the front wall of the container and to each of the bows so that intermediate bows are progressively drawn by the lead bow to their respective supporting positions along the length of the container as the lead bow is moved from storage to supporting position. The tarpaulin is not secured to the bows and hence may be side-rolled into position covering the container top.

9 Claims, 2 Drawing Sheets

WATERPROOF SIDE ROLLING TARP SYSTEM

FIELD OF THE INVENTION

The present invention relates to an improved side rolling tarpaulin for the open top of a truck trailer.

BACKGROUND OF THE INVENTION

Side rolling tarpaulin systems, such as that described and illustrated in Ellingson U.S. Pat. No. 4,691,957 issued Sept. 8, 1987 have proven desirable for use in providing waterproof coverings for open tops of truck trailers. Such tarpaulin systems comprise an elongated tarpaulin, with a longitudinal edge fixed to one side of the trailer. A roll bar is secured to the free edge of the tarpaulin and is rotated with a crank rod to roll the tarp over rigid transverse support members secured across the open top of the truck, to an enclosing position with that free edge positioned over and secured to the other side of the trailer.

One problem with such a system is that the transverse tarpaulin support members can be removed only with difficulty, usually requiring the operator of the truck to ascend to the tops of the walls of the trailer to physically remove these members. (Removal is often necessary when the trailer is being loaded from the top, a common occurrence with such open top truck trailers.) Cramaro U.S. Pat. No. 4,915,439 issued Apr. 10, 1990 provides an attempt to solve this problem by providing for the pivoting of these rigid transverse supports about one end out of position to clear the open top. Such a system is still relatively awkward to operate, requiring the operator to individually rotate each of the transverse members into and out of loading position clear of the top opening of the trailer. As well, the transverse members are not as securely held in transverse position, as otherwise would have been the case, since they must be readily releasable, from one end, to enable them to be pivoted out of transverse position when required.

Biancale U.S. Pat. No. 4,281,872 issued Aug. 4, 1981, Cramaro Canadian Patent No. 995,714 and U.S. Pat. No. 4,858,984 of Weaver issued Aug. 22, 1989 teach longitudinally retractable tarpaulin systems for truck trailers in which a series of transverse bows, are secured to the tarpaulin extending across the top of an open trailer, and have their ends secured to a single movable cable or a pair of movable cables. The tarpaulin system, supported on the bows, is secured to each of the bows. Movement of the cable or cables causes longitudinal movement of the bows and hence tarpaulin, to retract it into open position or to move it to closed position covering the top. Such a system is not practical with a side rolling tarpaulin, however since the tarpaulin must be secured to each of the movable bows for it to operate properly.

It is an object of the present invention to provide a side rolling tarpaulin system in which the open top of the trailer or truck box may be more easily cleared for loading or unloading, and in which the tarpaulin system may then be more easily closed to cover the top.

SUMMARY OF THE INVENTION

In accordance with the present invention, there is provided a tarpaulin system for an open top container having first and second parallel elongated side walls and a front wall with upper edges thereof at least partially defining the periphery of the open top of the container. An elongated tarpaulin is provided with a longitudinal edge secured to an upper edge of said first of the walls. A plurality of tarpaulin support means extend from the upper edge of one wall to the upper edge of the other wall across the open top of the container and spaced along its length. Means are provided to roll the top laterally into storage position adjacent its secured edge and unroll the tarpaulin transversely on the tarpaulin support means into position covering the top with the free, longitudinal edge of the tarp along the upper edge of the second side wall. Means are also provided to secure the longitudinal edge of the tarpaulin to an upper edge of said second of the side walls. The tarpaulin support means comprise a lead bow positioned at one end and a plurality of intermediate bows positioned at regular locations along the length of the container behind the lead bow when in tarpaulin supporting position. The bows extend transversely in parallel fashion across the open top. The ends of the bows are supported on the upper edges of the walls. Means are secured to the lead bow, when the tarpaulin is in storage position, to retract that bow from supporting position at one end of the container to storage position at the other end of the container. A strap means is secured to the front wall and to each of the bows so that the intermediate bows are progressively drawn by the lead bow t their respective supporting positions along the length of the container as the lead bow is moved from storage to supporting position. Guide means are associated with the intermediate bows to cause them to move in aligned fashion progressively to storage position adjacent each other at said other end of the container as the lead bow is retracted from supporting position to storage position.

The tarpaulin system according to the present invention permits the use of a tarpaulin side roll system, with its proven efficient waterproofing capabilities, with a retractable bow system which allows the bows to readily be removed from the loading area of the trailer, with consequent labour savings to the operator in not having to individually remove and replace the bows as required, as was the case with prior art side rolling tarpaulin systems.

BRIEF DESCRIPTION OF THE DRAWINGS

These and other objects and advantages of the invention will become apparent upon reading the following detailed description and upon referring to the drawings in which.

Figure 1:
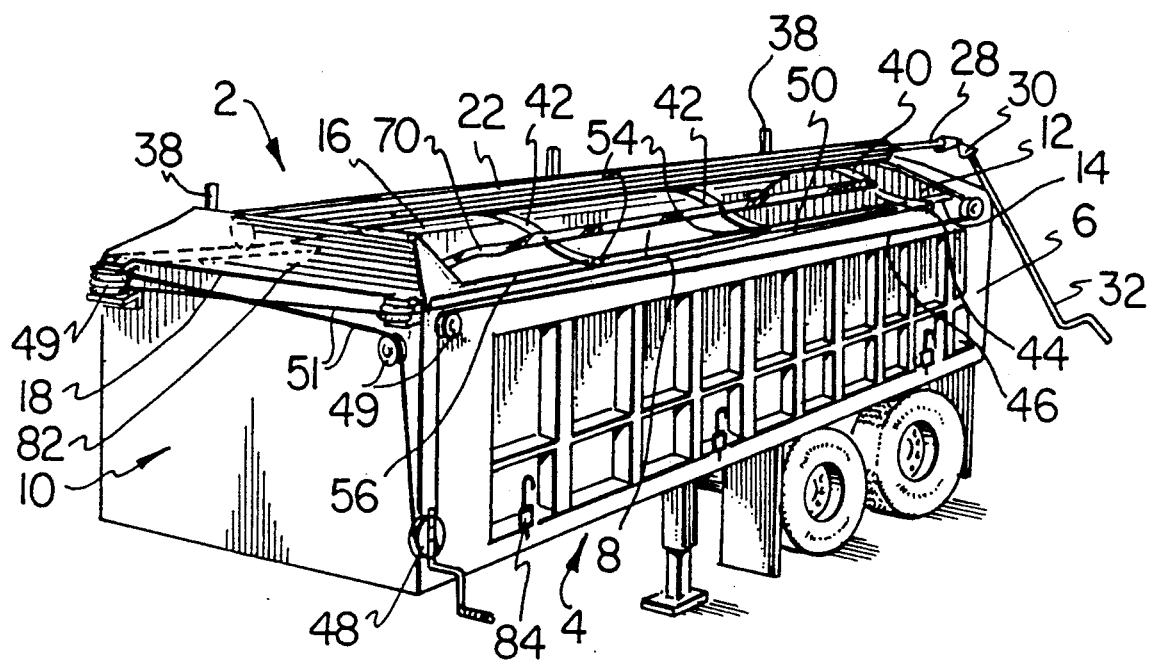
FIG. 1 is a perspective view of a box type truck body on which a side rolling tarpaulin cover system in accordance with the present invention has been mounted.

While the invention will be described in conjunction with illustrated example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the drawings similar features have been given similar reference numerals.

Turning to FIG. 1 there is illustrated a side rolling tarpaulin system 2 in accordance with the present invention for an open top trailer or truck body 4, in accordance with the present invention. Truck body 4 has elongated side walls 6 and 8, front end wall 10 and rear end wall 12, the latter opening as required for rear loading of the truck body 4. The upper edges 14 and 16 respectively of side walls 6 and 8, as well as the upper edges 18 and 20 of front end wall 10 and rear end wall 12 respectively, define the periphery of the opening of the top of truck body 4.

Figure 3:
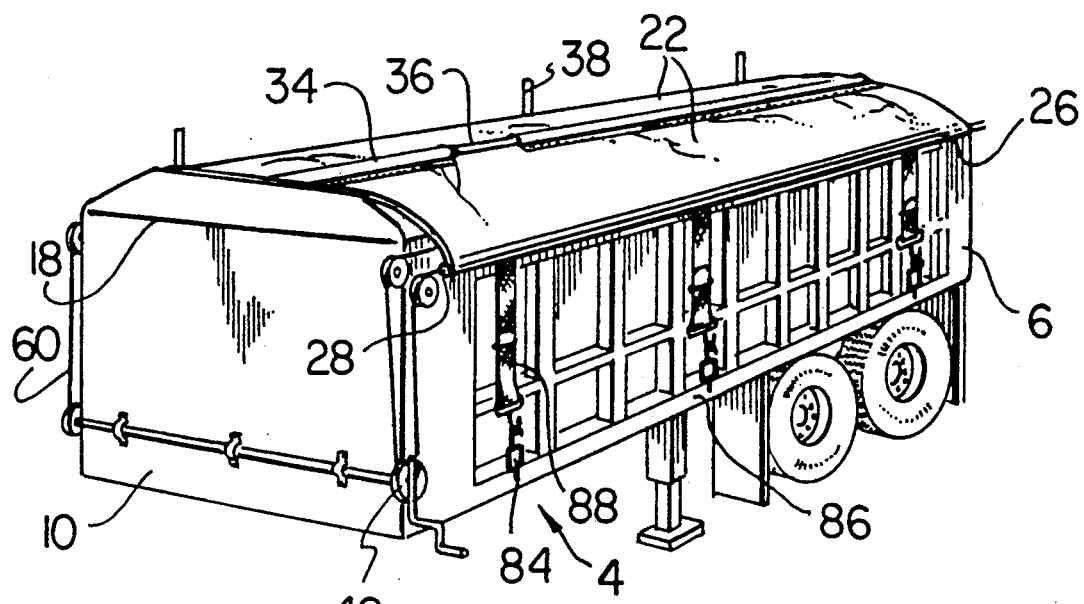
FIG. 3 is a perspective view of the system of FIG. 1 in closed position enclosing the top of the truck body.
Figure 4:
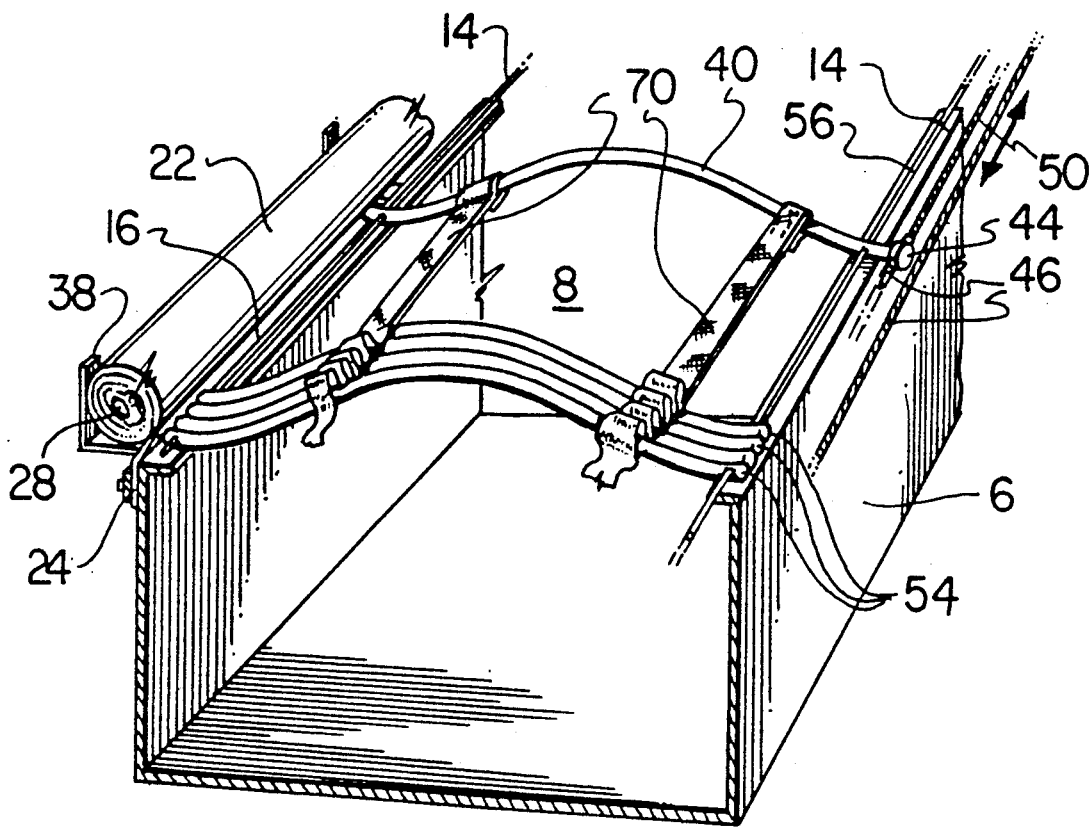
FIG. 4 is a schematic partial view in section of a truck body of FIG. 2 with the tarpaulin system in open position, for loading the truck body from the top.

The system according to the present invention comprises a side rolling tarpaulin 22 having a longitudinal edge 24 which is secured to the outer surface of side wall 8 near its upper edge 16 (FIG. 4). In the other edge 26 of tarpaulin 22 is secured a roll bar 28 on the end of which is a universal joint 30 which is connectable to one end of a crank rod 32 by which a person at ground level may, by axial rotation of crank rod 32 in one direction, produce axial rotation in roll bar 28 to roll tarpaulin 22 up about roll bar 28. Axial rotation of crank rod 32 in the other direction results in axial rotation of roll bar 28 to unroll tarpaulin 22. The rolled and unrolled positions of tarpaulin 22 are illustrated respectively in FIGS. 3 and 4. As can be seen in FIG. 3, in the center of tarpaulin 22 is a longitudinally extending pocket 34, within which is positioned a ridge pole 36, the purpose of which is to provide additional support for tarpaulin 22 when it is in its unrolled, enclosing position as illustrated in FIG. 3.

Appropriate cradle arms 38 are secured to and upwardly extend from upper edge 14 of side wall 6, as illustrated, to provide additional support for tarpaulin 22 and in rolled up position (FIG. 4) and prevent tarpaulin 22 from falling sideways outwardly, when in rolled up position on the top of upper edge 14.

As can be seen in FIG. 1, a plurality of tarpaulin support means, in the form of a lead bow 40 and a plurality of intermediate bows 42 are provided, these bows extending laterally across the open top of truck body 4, in spaced parallel fashion as illustrated, to support thereon tarpaulin 22. The ends 44 of lead bow 40 are fixedly secured to a movable drive cable 46 as illustrated in FIG. 4, so that these ends move at a similar speed a similar amount in a similar direction on each side of truck body 4 when the drive cable is activated by a winch 48. In the illustrated embodiment of FIGS. 1, 2 and 4, a single cable as described and illustrated in Biancale U.S. Pat. No. 4,281,872 is used, with the cable being mounted on a plurality of pulleys 49 attached to the truck body to support runs of the cable along horizontal, elongated reaches 50 extending parallel to the upper edges 14 and 16, with a pair of runs 51 of the cable crossing over each other from one side of the truck body to the other below or at the front end 10 as illustrated (FIG. 1), so that movement of the cable along its path causes horizontal reaches 50 to move at the same speed in the same direction relative to the upper edges 14 and 16.

The ends 54 of intermediate bows 42 may be either slidably mounted on drive cable 46, or, as illustrated in FIG. 4, may be slidably mounted on a second, semi-rigid cable 56 mounted on the upper portions of sides 6 and 8 as illustrated. The semi-rigid cable 56 is preferably located near to reaches 50 of drive cable 46, on each side wall of truck body 4, and parallel thereto.

Figure 2:
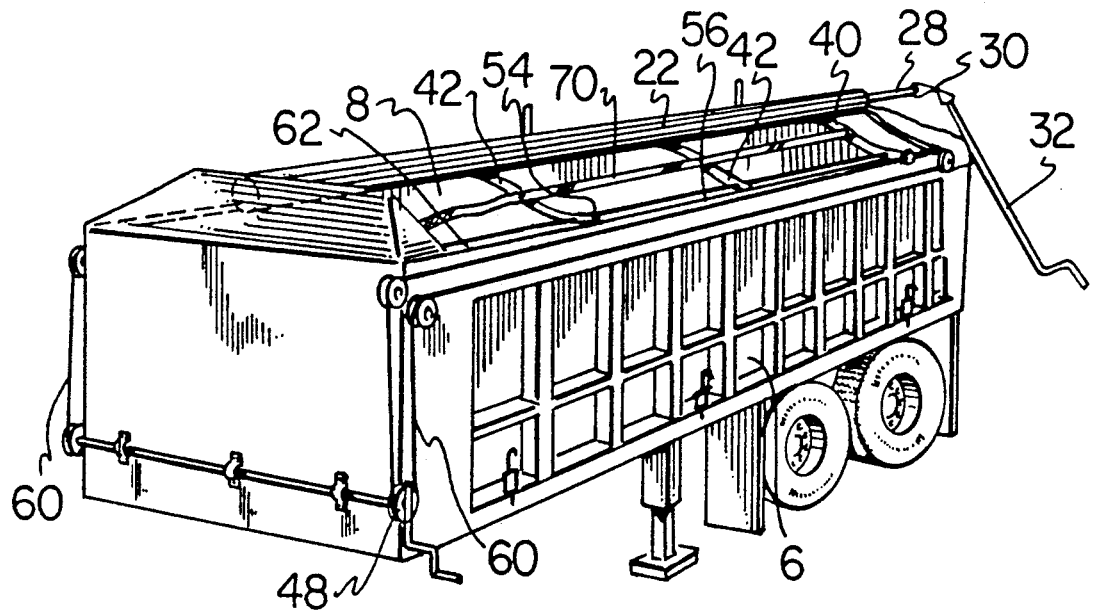
FIG. 2 is a perspective view of an alternative embodiment of tarpaulin cover system in accordance with the present invention.

In an alternative embodiment illustrated in FIG. 2, instead of a single drive cable 46, a pair of drive cables 60, as illustrated and described in Cramaro Canadian Patent No. 995,714 operated by winch 48 may be mounted near the upper edges 14 and 16 of each of side walls 6 and 8, again with a horizontal run 62 of each of these cables extending parallel to semi-rigid cable 56 or a conventional track means (not illustrated) to guide the ends 54 of intermediate bows 42.

A strap 70 (or a plurality thereof), which for example may be made of nylon belting approximately one in a half inches to two inches in width, is fastened to the front end wall 10 and is secured to each of the intermediate bows 42 and lead bow 40 as illustrated. Strap 70 is fastened to the front wall 10 and to each of the intermediate bows 42 and lead bow 40, so that as lead bow 40 is moved from its retracted position, near front end 10 as illustrated in FIG. 4, it draws strap 70 progressively with it, and hence intermediate bows 42, until, when lead bow 40 is in its fully extended position near rear end wall 12 (FIGS. 1 and 2) intermediate bows 42 are in their appropriate positions, spaced and parallel from each other, for supporting tarpaulin 22. It will be understood that tarpaulin 22 is no way attached to lead bow 40 or intermediate bows 42 and, when winch 48 is being operated to retract or extend bow 40, tarpaulin 22 is in its rolled up position, resting on cradles 38 (FIG. 4).

When it is desired to retract lead bow 40 and intermediate bows 42, winch 48 is turned in the appropriate direction. As lead bow 40 is retracted, it progressively abuts against and causes retraction of the nearest adjacent intermediate bows 42 until all off the intermediate bows 42 and lead bow 40 are moved to open position adjacent front end 10, as illustrated in FIG. 4.

As can been seen in FIG. 1, a metal front cap 82 may be provided, at the top of front end wall 10, to deflect wind over the front of the truck body 4 while protecting tarpaulin 22 which does not hang over the trailer front.

Any appropriate conventional tie down device 84, preferably located near the bottom rail 86 of the trailer body along sides 6 and 8, may be used to attach thereto tie down straps 88 which are fastened to the tarpaulin along its free end, to secure the free longitudinal edge of the tarpaulin in place when it is in closed position (FIG. 3).

It will be understood that the system according to the present invention provides an effective system for waterproofing open top truck bodies and trailers, but the same time providing an extremely easy method of operation for operators, when loading and unloading the truck body.

Thus it is apparent that there has been provided in accordance with the invention a side roll tarpaulin system that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a tarpaulin system for an open top container having first and second parallel elongated side walls and a front wall with upper edges at least partially defining the periphery of the open top of the container, the system comprising an elongated tarpaulin having a longitudinal edge secured to an upper edge of said first of the side walls, a plurality of tarpaulin support means extending from the upper edge of one wall to the upper edge of the other wall across the open top of the container and spaced along its length, means to roll the top laterally into storage position adjacent its secured edge and unroll the tarpaulin transversely on the tarpaulin support means into position covering the top with a free, longitudinal edge of the tarp along an upper edge of the second side wall and means to secure the free longitudinal edge of the tarpaulin to said upper edge of said second of the side walls, the improvement characterized in that the tarpaulin support means comprises a lead bow positioned at one end and a plurality of intermediate bows positioned at regular locations along the length of the container behind the lead bow when in tarpaulin-supporting position, the bows extending transversely in parallel fashion across the open top, the ends of the bows supported on the upper edges of the walls; means secured to the lead bow, when the tarpaulin is in storage position to retract that bow from supporting position at one end of the container to storage position at the other end of the container; strap means, secured to the front wall and to each of the bows so that the intermediate bows are progressively drawn by the lead bow to their respective supporting positions along the length of the container as the lead bow is moved from storage to supporting position; guide means associated with the intermediate bows to cause them to move in aligned fashion progressively to storage position adjacent each other at said other end of the container as the lead bow is retracted from supporting position to storage position.

2. A tarpaulin system according to claim 1, wherein the lead bow is secured to a movable endless cable means.

3. A tarpaulin system according to claim 1, wherein the lead bow is secured to a drive cable, the drive cable comprising a single cable installed on the container so that each one of a pair of elongated horizontal reaches of the cable extends along a corresponding one of the upper edges of the walls, the cable adapted to be in the form of an endless loop with the cable having a path of travel defined by a series of elongated runs including the horizontal reaches, and a plurality of pulleys attached to the container to support said runs and arranged with a pair of said runs crossing over each other from one side of the body to the other so that movement of the drive cable along its path causes each of said pair of horizontal reaches to move similarly in the same direction relative to the container to effect longitudinal movement of the lead bow.

4. A tarpaulin system according to claim 1, wherein the lead bow is secured to a drive cable means comprising two cables, one installed on each side wall of the container so that each one provides a horizontal reach thereof extending along parallel to the corresponding one of the upper edges of the walls so that the cables move similarly along their paths to cause each of said horizontal reaches to move similarly in the same direction relative to the body and affect the longitudinal movement of the lead bow.

5. A tarpaulin system according to claim 2, wherein a roll bar is secured to the free, longitudinal edge of the tarpaulin in longitudinal fashion, and means are provided for selectively rotating the roll bar about its longitudinal axis in a first direction to unroll the tarpaulin to cover the top of the container, and in the opposite direction to roll up the tarpaulin to uncover the top of the container.

6. A tarpaulin system according to claim 3, wherein a roll bar is secured to the free, longitudinal edge of the tarpaulin in longitudinal fashion, and means are provided for selectively rotating the roll bar about its longitudinal axis in a first direction to unroll the tarpaulin to cover the top of the container, and in the opposite direction to roll up the tarpaulin to uncover the top of the container.

7. A tarpaulin system according to claim 1, wherein a ridge pole is secured longitudinally in the center of the tarpaulin to rest on the support means and provide greater support for the tarpaulin when the tarpaulin is in position covering the top of the container.

8. A tarpaulin system according to claim 7, wherein a longitudinal pocket is provided in the center of the tarpaulin to receive and secure the ridge bow in position.

9. A tarpaulin system according to claim 1, wherein the guide means for the intermediate bows comprise semi-rigid cable means longitudinally extending along the upper edges of the walls and immovably secured thereto, the ends of the intermediate bows slidably secured to the semi-rigid cable means.

* * * * *